US006145561A

United States Patent [19]

Watanabe et al.

[11] Patent Number: 6,145,561

[45] Date of Patent: Nov. 14, 2000

[54] TAPE PROCESSING DEVICE WITH A COATING DEVICE FOR THE CUTTING BLADE AND A STATIC ELIMINATOR BRUSH

[75] Inventors: Kenji Watanabe; Takanobu Kameda; Tomoyuki Shimmura; Tomohiro Moriya; Hironaga Iida; Youko Eto, all of Tokyo, Japan

[73] Assignee: Seiko Epson Corporation and King Jim Co., Ltd., Tokyo, Japan

[21] Appl. No.: 08/965,389

[22] Filed: Nov. 6, 1997

[30] Foreign Application Priority Data

| | | | |
|---|---|---|---|
| Nov. 7, 1996 | [JP] | Japan | 8-311490 |
| Dec. 13, 1996 | [JP] | Japan | 8-352781 |
| Dec. 17, 1996 | [JP] | Japan | 8-353675 |

[51] Int. Cl.[7] .............................. B32B 31/00; B26D 5/08; B41J 15/00

[52] U.S. Cl. ............................ 156/517; 156/531; 83/622; 400/621

[58] Field of Search ..................................... 156/517, 525, 156/531, 510, 598; 83/622, 168; 400/621

[56] References Cited

U.S. PATENT DOCUMENTS

| | | |
|---|---|---|
| 2,284,859 | 6/1942 | Blair . |
| 2,496,018 | 1/1950 | Pearson . |
| 2,524,653 | 10/1950 | Dalley . |
| 2,568,234 | 9/1951 | Haufrect . |
| 2,597,519 | 5/1952 | O'Brien . |
| 2,708,311 | 5/1955 | McCloud . |

(List continued on next page.)

FOREIGN PATENT DOCUMENTS

| | | |
|---|---|---|
| 0841182 | 4/1999 | European Pat. Off. . |
| 350 98 44 A1 | 11/1986 | Germany . |
| 37 05 168 A1 | 2/1987 | Germany . |
| 295 040 32 | 5/1995 | Germany . |
| 296 10 503 U1 | 9/1996 | Germany . |
| 62-1899 | 1/1987 | Japan . |
| 62-194061 | 12/1987 | Japan . |
| 63-176651 | 11/1988 | Japan . |
| 2-303873 | 12/1990 | Japan . |
| 3-4237 | 1/1991 | Japan . |
| 4-251776 | 9/1992 | Japan . |
| 05096840 | 4/1993 | Japan . |
| 5-39893 | 5/1993 | Japan . |
| 06008194 | 1/1994 | Japan . |
| 06079934 | 3/1994 | Japan . |
| 6-79934 | 3/1994 | Japan . |
| 07040628 | 2/1995 | Japan . |
| 07108492 | 4/1995 | Japan . |
| 07237310 | 9/1995 | Japan . |
| 08058203 | 3/1996 | Japan . |
| 08207176 | 8/1996 | Japan . |
| 09274346 | 10/1997 | Japan . |
| 7703349 | 10/1977 | Netherlands . |
| 474 549 | 6/1969 | Switzerland . |
| 1500201 | 8/1989 | U.S.S.R. . |

OTHER PUBLICATIONS

Translation to Japanes Patent No. 6–79934, Mar. 22, 1994.

*Primary Examiner*—Richard Crispino
*Assistant Examiner*—Sue A. Purvis
*Attorney, Agent, or Firm*—Hogan & Hartson LLP

[57] ABSTRACT

A tape processing device has a feed device, a cutter assembly, and a coating device. The feed device feeds a tape having a layer of an adhesive. The cutter assembly has at least one cutting blade and cuts the tape. The coating device applies an adhesion-preventing liquid on the at least one cutting blade of the cutter assembly to thereby prevent any of the tape and the adhesive of the tape from adhering to the at least one cutting blade of the cutter assembly.

20 Claims, 11 Drawing Sheets

U.S. PATENT DOCUMENTS

| | | | |
|---|---|---|---|
| 2,873,526 | 2/1959 | Visconti . | |
| 3,387,642 | 6/1968 | Bennett . | |
| 3,735,763 | 5/1973 | Shannon . | |
| 3,827,125 | 8/1974 | Matthews . | |
| 4,048,721 | 9/1977 | Gunson . | |
| 4,089,113 | 5/1978 | Moritz et al. . | |
| 4,288,280 | 9/1981 | Morin | 83/922 X |
| 4,398,441 | 8/1983 | Jue . | |
| 4,417,941 | 11/1983 | Lin | 156/475 |
| 4,481,053 | 11/1984 | Tokuno et al. | 156/157 |
| 4,544,293 | 10/1985 | Cranston et al. . | |
| 4,742,742 | 5/1988 | Yokoe | 83/101 |
| 4,768,259 | 9/1988 | Rock et al. . | |
| 4,964,216 | 10/1990 | Gosselin . | |
| 4,967,474 | 11/1990 | Wells . | |
| 4,978,415 | 12/1990 | Jones | 83/922 X |
| 5,259,681 | 11/1993 | Kitazawa et al. | 400/621 |
| 5,319,854 | 6/1994 | Pracht . | |
| 5,441,352 | 8/1995 | Shiota | 400/621 |
| 5,447,383 | 9/1995 | Hirono et al. | 400/621 |
| 5,458,423 | 10/1995 | Sims et al. | 400/621 |
| 5,492,420 | 2/1996 | Nunokawa et al. . | |
| 5,595,447 | 1/1997 | Takayama et al. . | |
| 5,597,247 | 1/1997 | Inakoshi et al. | 400/207 |
| 5,611,253 | 3/1997 | Saito et al. | 83/383 |
| 5,986,874 | 1/1991 | Kawada | 156/577 |

TAPE PROCESSING DEVICE WITH A COATING DEVICE FOR THE CUTTING BLADE AND A STATIC ELIMINATOR BRUSH

BACKGROUND OF THE INVENTION

1. Field of the Invention

This invention relates to a tape processing device which can properly deal with a tape having an adhesive layer, such as an adhesive tape used as a printing tape.

1. Prior Art

Conventionally, there has been proposed e.g. by Japanese Laid-Open Patent Publication (Kokai) No. 6-8194, a tape processing device of this kind, which is applied to a tape printing apparatus for obtaining labels from a printing tape. The proposed tape printing apparatus is loaded within its casing with a tape cartridge accommodating a roll of an adhesive tape having on its back an adhesive layer which is covered with a peel-off paper (peel-off paper-backed adhesive tape). The adhesive tape is rolled out from the tape cartridge, and a print head is pressed against the adhesive tape to thereby effect printing on the tape. Then, the printed portion of the tape is brought to a position before a scissors-like cutter and cut off by the cutter to a predetermined length. Then, the cut-off piece of the adhesive tape is delivered from the apparatus via a tape exit formed in the casing. The cut-off piece, which was printed, can be affixed to a file or the like as a label after removing the peel-off paper therefrom. In the above process of preparing a printed label from the printing tape, when the adhesive tape is cut off by the cutter, the adhesive of the adhesive tape can adhere to cutting blades of the cutter to cause various inconveniences. For example, the cutting blades can be disabled from moving, or the cut-off piece is affixed to the blades to be jammed into the tape exit or cut again.

On the other hand, scissors have been proposed e.g. by Japanese Patent (Kokoku) No. 3-4237, which are constructed to prevent an adhesive of an adhesive tape from adhering to cutting blades thereof. The scissors are comprised of a fixed blade (blade to which its support shaft is fixed) and a movable blade each of which has its inner sides baked with a coating of a fluorine resin to thereby prevent the adhesive from adhering to the cutting blades when the adhesive tape is cut off.

In the light of this prior art, it is contemplated that the baking of a coating of a fluorine resin on the cutting blades of the cutter can be a solution to the above inconveniences of the cutter employed in the conventional tape processing device. However, the baking of the coating of fluorine resin complicates the manufacturing process of the cutter and increases the manufacturing cost of the same, resulting in an increase in the whole manufacturing cost of the tape processing device. Further, in practice, the baked coating of the fluorine resin is not provided on a cutting edge portion so as to prevent degradation of the cutting performance of the cutter. As a result, it is impossible to preclude the occurrence of adhering of an adhesive and the cut-off piece of the adhesive tape to this portion of the cutter.

Further, the cutter of the proposed tape processing device is a scissors-like type which is comprised of a fixed blade and a movable blade pivotally connected by a support shaft, and the movable blade rotates to cut off a strip of the tape which is brought to a position in line with the fixed blade fixed to a frame of the device. The cutting edges of the fixed blade and the movable blade are formed to have a linear or straight profile similarly to typical scissors.

Since the fixed blade and the movable blade are each formed with a cutting edge which extends in a straight line (straight cutting edge), the cutting edge angle formed by the cutting edge of the fixed blade and that of the movable blade decreases as the depth of the cut into the tape increases. Further, due to limited space within the device, an initial cutting edge angle cannot be set to a very large value. More specifically, the cutting of the tape is started with a cutting edge angle of the blades opening at one side of the tape in the direction of the width of the tape being equal to approximately ten degrees, and terminates with a cutting angle of the same at the other side of the tape being equal to approximately two degrees. As the tape is cut to a larger depth, the cutting edge angle becomes smaller, and inversely, the resistance to the cutting action becomes larger. Therefore, it is required to progressively increase the cutting torque as the cutting process proceeds. Moreover, as the depth of the cut is increased, the edge-to-edge crossing point (point of action or working point) becomes farther from the support shaft (fulcrum), so that according to the principles of the lever and fulcrum, it is required to increase the cutting torque all the more. Therefore, the cutting torque to be applied at the point of application of force varies in a wide range, and especially when the tape is automatically cut, a drive source from which torque is obtained for the automatic cutting operation is required to have a large output power to make the same adapted to a peak of possible required cutting torque.

Further, Japanese Laid-Open Patent Publication (Kokai) No. 8-58203 proposes a tape printing apparatus similar to the above, which uses a tape cartridge having a casing formed of a resin mixed with a conductive material, such as carbon, and receives the tape cartridge in a cartridge compartment formed of a resin mixed with a conductive material, such as carbon, and at the same time connected to a ground, in a manner cooperative with the casing of the tape cartridge. This configuration of the tape printing apparatus and the tape cartridge grounds the tape having static electricity generated thereon through friction of the tape with other component parts, which occurs during the manufacturing process of the tape and when the tape is rolled out, to thereby prevent the static electricity from adversely affecting the component parts of the device.

According to the proposed tape printing device, however, since the tape cartridge is simply connected to the ground, it is impossible to eliminate or dissipate static electricity from the charged tape due to the nature of static electricity. That is, since a static-reducing member is not brought into contact with a whole surface area of the tape from which static electricity should be dissipated, static electricity cannot be fully dissipated from the charged tape. Further, the tape is newly electrified or charged through friction thereof with passage members and other component parts of the device even when it is rolled out from the tape cartridge and advanced to the tape exit for delivery therefrom. Therefore, when the tape is automatically cut, a piece of the tape cut off by the cutter can adhere to the tape exit due to its static charge, resulting in re-cutting or jamming thereof.

SUMMARY OF THE INVENTION

It is a first object of the invention to provide a tape processing device which is capable of efficiently preventing a cut-off piece of a tape and an adhesive of the tape from adhering to cutting blades thereof.

It is a second object of the invention to provide a tape processing device which is free from adverse effects of static electricity on a tape, which can cause e.g. re-cutting of the cut-off piece and jamming of the same in the tape exit.

It is a third object of the invention to provide a tape processing device which is capable of reducing torque required to be applied to a cutter thereof in cutting off a tape.

To attain the first object, the invention provides a tape processing device comprising:

a feed device for feeding a tape having a layer of an adhesive;

a cutter assembly for cutting the tape, the cutter assembly having at least one cutting blade; and a coating device for providing a coating of an adhesion-preventing liquid on the at least one cutting blade of the cutter assembly to thereby prevent any of the tape and the adhesive of the tape from adhering to the at least one cutting blade of the cutter assembly.

According to this construction, the cutting blade(s) of the cutter assembly is/are coated with the adhesion-preventing liquid. Therefore, when the tape including the adhesive layer is cut by the cutting blade(s), the adhesive strength of the adhesive of the adhesive layer becomes far larger on the tape side than on the cutting blade side, so that the adhesive is not separated from the adhesive layer of the tape to adhere to the cutting blade(s). Further, even if a cut-off piece of the tape adheres to the cutting blade by its adhesive, the weight of the cut-off piece is larger in force than an adhesive strength of its adhesive adhering to the cutting blade, so that the cut-off piece does not remain adhering to the cutting blade. Therefore, it is possible to prevent the adhesive from accumulating on the cutting blades(s) to disable the tape processing device from its cutting operation, and prevent the cut-off piece from being cut again or jammed into the tape exit. This makes it possible to enhance the reliability of the tape processing device as well as prolong the service life thereof. It is preferred that the adhesion-preventing liquid is a non-volatile (or almost non-volatile) liquid to maintain the above-mentioned action of the liquid.

Preferably, the coating device is arranged in a manner such that the at least one cutting blade is brought into contact with the coating device, and includes a reservoir for holding the adhesion-preventing liquid.

According to this preferred embodiment, the adhesion-preventing liquid is held in the reservoir provided in the cutter assembly, and the cutting blade in cutting operation is brought into contact with the reservoir, whereby it is possible to always coat the cutting blade(s) with an appropriate amount of adhesion-preventing liquid. Therefore, when the tape including the adhesive layer is cut, the adhesive is not peeled off from the tape to adhere to the cutting blade(s), nor the cut-off piece of the tape adheres to the cutting blade(s) by its adhesive. Moreover, since the reservoir is provided for supplying the adhesion-preventing liquid to the cutting blade(s), it is possible to enable the above action of the adhesion-preventing liquid to last for a long time period in a manner meeting the requirement of the service life of the device.

More preferably, the at least one cutting blade of the cutter assembly comprises a fixed blade and a movable blade, the fixed blade and the movable blade each having a cutting edge and cooperatively performing a cutting operation by sliding of the cutting edge of the movable blade past the cutting edge of the fixed blade, the reservoir being arranged on an inner side of the fixed blade at a location where the movable blade crosses the fixed blade.

According to this preferred embodiment, the reservoir is arranged on the inner side of the fixed blade at a location where the movable blade crosses the fixed blade. Therefore, whenever the cutting operation is performed, the movable blade is brought into contact with the reservoir to be supplied or coated with the adhesion-preventing liquid. The supplied adhesion-preventing liquid automatically spreads between the inner sides of the fixed blade and the movable blade by capillary action up to portions thereof contributing to the cutting operation, whereby it is possible to accurately provide the coating of the adhesion-preventing liquid on the portions on the inner sides and cutting edges of the blades to which the adhesive is liable to adhere. Moreover, the adhesion-preventing liquid spreads on the inner sides of the blades up to shaft portions of the fixed and movable blades pivotally connected to form scissors-like cutting means, whereby the adhesion-preventing liquid serves as a lubricant and a rust preventive, as well. It should be noted that throughout the specification, the "fixed blade" means a blade to which the support shaft is fixed.

More preferably, the reservoir includes an adhesion-preventing liquid absorber for absorbing and holding the adhesion-preventing liquid.

According to this preferred embodiment, the adhesion-preventing liquid can be held in the adhesion-preventing liquid absorber which can be simple in construction, in a manner suitable for coating the cutting blades therewith, and it is possible to effectively prevent damage to the movable blade which can occur when the movable blade is brought into contact with the adhesion-preventing liquid.

Further preferably, the reservoir further includes a holder for holding the adhesion-preventing liquid absorber on the fixed blade, the holder fixedly holding a half portion of the adhesion-preventing liquid absorber, with another half portion of the adhesion-preventing liquid absorber on a movable blade side being uncovered.

According to this preferred embodiment, the cutting blades in cutting operation are suitably brought into contact with the adhesion-preventing liquid absorber containing the adhesion-preventing liquid, and at the same time even if they are repeatedly brought into contact with each other, the adhesion-preventing liquid absorber is not displaced from its proper position.

Even more preferably, the adhesion-preventing liquid absorber is arranged at a location where the cutting edge of the movable blade for performing cutting operation is brought into slight contact with the another half portion of the adhesion-preventing liquid absorber, which is uncovered.

According to this preferred embodiment, the cutting edge of the movable blade is brought into only light urging contact with the uncovered portion of the adhesion-preventing liquid absorber, which prevents an excessively large amount of adhesion-preventing liquid from being applied to the movable blade. Therefore, it is possible to minimize the amount of adhesion-preventing liquid attached to a printing tape by way of the movable blade, that is, it is to reduce the amount of the attached liquid to such a small amount as will prevent the user from recognizing it.

Further preferably, the adhesion-preventing liquid absorber is formed of a foamed cellulose.

According to this preferred embodiment, the adhesion-preventing liquid absorber can have a moderate elasticity and a moderate liquid holding power, whereby it is possible to enable the adhesion-preventing liquid to be easily applied to the cutting blades and at the same time prevent the held adhesion-preventing liquid from dripping or inversely from being incapable of oozing out.

Preferably, the adhesion-preventing liquid is silicone oil.

According to this preferred embodiment, it is possible to use an adhesion-preventing liquid having properties resistant to environmental changes and stable at ordinary temperatures, whereby the adhesion-preventing liquid can maintain stable adhesion-preventing performance for a long time period.

Preferably, the tape processing device includes a tape exit for delivering a cut-off portion of the tape therefrom, the cutter assembly being arranged immediately close to the tape exit.

The tape has an electrostatic property and is received within a casing. To attain the second object of the invention, it is preferred that the cutter assembly is provided with a static eliminator brush which is brought into contact with the tape in a position facing the cutter assembly, and at the same time grounded, for thereby eliminating static electricity charged on the tape.

According to this preferred embodiment, the cutter assembly arranged at a location immediately inward of the tape exit along the path of running of the tape is provided with the static eliminator brush. Therefore, the static electricity on the tape is eliminated or dissipated when the tape is brought to the cutter assembly, and after the tape is cut off, the resulting cut-off piece is properly discharged from the tape exit without adhering to the cutter assembly nor the tape exit. Further, by arranging the static eliminator brush on the cutter assembly, a dedicated holder for the static eliminator brush can be dispensed with, and at the same time, static electricity generated by the cutting operation of the cutter assembly can be eliminated. On the other hand, since the static eliminator brush is brought into contact with a strip of the tape which is advanced to the cutter assembly, it is possible to efficiently and fully eliminate the static electricity on the tape by causing the static eliminator brush to sweep on the tape when the tape is advanced to the tape exit. Therefore, it is possible to eliminate the adverse effects of static electricity, which can cause e.g. re-cutting of the cut-off piece of the tape or jamming of the same in the tape exit, thereby enhancing the reliability of the tape processing device.

More preferably, the static eliminator brush is grounded via the cutter assembly.

According to this preferred embodiment, since the cutter assembly can be utilized as a grounding member, it is possible to secure a larger ground than when the static eliminator brush is directly grounded by a lead wire.

More preferably, the cutter assembly has a fixed blade and a movable blade, the fixed blade and the movable blade cooperatively performing a cutting operation, the static eliminator brush being fixed to the fixed blade.

According to this preferred embodiment, the static eliminator brush can be made fixed or immovable. Therefore, the static eliminator brush can be brought into stable contact with the tape, and at the same time the lead wire on the ground side can be easily routed.

Further preferably, the static eliminator brush is fixed to the fixed blade in a state pressed against a surface of the fixed blade.

According to this preferred embodiment, static electricity can be dissipated via a large area of the static eliminator brush in intimate contact with the surface of the fixed blade, whereby failure of electric conduction can be positively prevented.

Even more preferably, the tape processing device includes a presser plate, the static eliminator brush being sandwiched between the presser plate and the fixed blade, and fixed to the surface of the fixed blade in the state pressed against the surface of the fixed blade by a plurality of screws screwed through the presser plate into the fixed plate.

According to this preferred embodiment, it is possible to press the static eliminator brush against the fixed blade with uniformly-applied force to thereby firmly fix the former to the latter.

Even more preferably, the tape processing device includes a guide member which is arranged at a location opposed to the static eliminator brush in a manner such that the tape facing the cutter assembly is positioned between the guide member and the static eliminator brush.

According to this preferred embodiment, the tape in contact with the static eliminator brush is held by the guide member from the opposite side to the static eliminator brush, whereby it is possible to stably bring the static eliminator brush and the tape into contact with each other, thereby reliably eliminating static electricity from the tape.

More preferably, the static eliminator brush comprises a plurality of static eliminating elements, each of which is formed by a bundle of static eliminator strands, the static eliminating elements being arranged along a width of the tape facing the cutter assembly in a manner spaced at equal intervals.

According to this preferred embodiment, it is possible to reduce the number of static eliminator strands compared with a case in which an immense number of static eliminator strands are arranged on a whole area along the width of the tape facing the cutter assembly, whereby it is possible to reduce the cost of the static eliminator brush with no static-eliminating performance penalty. It is preferred that in dealing with a plurality of types of tapes having tape widths different from each other, the bundles of static eliminator strands are arranged in a manner adapted to the type of tape having the maximum width.

To attain the third object of the invention, it is preferred that the at least one cutting blade of the cutter assembly comprises a fixed blade and a movable blade, the fixed blade and the movable blade each having a cutting edge and cooperatively performing a cutting operation by sliding of the cutting edge of the movable blade past the cutting edge of the fixed blade, at least one of the cutting edge of the fixed blade and the cutting edge of the movable blade is curved to have an outward curvature in a direction of the relative rotation for the cutting operation.

According to this preferred embodiment, since at least one of the cutting edge of the cutting blade and the cutting edge of the movable blade is curved to have an outward curvature in a direction of the relative rotation, the cutting edge angle formed between the cutting edge of the fixed blade and the cutting edge of the movable blade does not decrease as the tape is cut deeper, differently from a straight cutting edge. In other words, there is little variation in the cutting edge angle as the tape is cut deeper and the resistance to the cutting action does not become extremely large. Therefore, it is possible to curb the peak of cutting torque required by the cutting action of the cutter assembly. Therefore, the torque required to be applied to the cutter in cutting the tape can be made relatively small, which means that the cutter exhibits excellent cutting performance. Further, for a type of the tape processing device which causes the cutter assembly to automatically operate for cutting operation, the power of a drive source for driving the cutter assembly can be relatively small.

More preferably, the cutting edge of the fixed blade and the cutting edge of the movable blade are designed to form a cutting edge angle therebetween which progressively increases as the tape is cut deeper.

According to this preferred embodiment, the cutting torque dependent on the cutting edge angle decreases as the cutting of the tape proceeds. Therefore, it is possible to further curb the peak of the cutting torque required in cutting the tape.

More preferably, the tape processing device includes a frame, the fixed blade being fixed to the frame, the cutting edge of the fixed blade having a straight profile, and the cutting edge of the movable blade having a curved profile.

According to the preferred embodiment, since the cutting edge of the fixed blade has a straight profile, and the fixed blade is fixed to the frame of the type processing device, it is possible to guide the tape in its free state to the fixed blade in a manner in line with the cutting edge of the same, and at the same time cut off the tape in position, i.e. without applying an undesired force thereto.

Further preferably, the curve formed by the cutting edge of the movable blade is generally arcuate.

According to this preferred embodiment, it is possible to machine the movable blade including the cutting edge thereof in a simplified manner.

Further preferably, the cutting edge of the movable blade has a saw-toothed shape.

According to this preferred embodiment, as each tooth of the cutting edge of the movable blade cuts into the tape, the cutting edge angle formed thereby, as viewed microscopically, becomes by far larger than the cutting edge angle generally formed by the cutting edge as a whole. Therefore, it is possible to curb the peak of the required cutting torque to a even lower level. Further, since each tooth bites into the tape, displacement of the tape in the direction of the tip of the blade is prevented. This makes it possible to prevent the tape from being cut while being displaced, and prevent the cut-off piece from having a curved cut end.

To attain the third object of the invention, it is preferred that the at least one cutting blade of the cutter assembly comprises a fixed blade and a movable blade, the fixed blade and the movable blade each having a cutting edge and cooperatively performing a cutting operation by sliding of the cutting edge of the movable blade past the cutting edge of the fixed blade, at least one of the cutting edge of the fixed blade and the cutting edge of the movable blade has a saw-toothed shape.

According to this preferred embodiment, as each tooth of the cutting edge of the at least one of the fixed blade and the movable blade cuts into the tape, the cutting edge angle generally formed thereby, as viewed microscopically, becomes by far larger than the cutting edge angle formed by the cutting edge as a whole. Therefore, it is possible to curb the peak of the required cutting torque to a even lower level. Further, since each tooth bites into the tape, displacement of the tape in the direction of the tip of the blade is prevented.

The above and other objects, features, and advantages of the invention will become more apparent from the following detailed description taken in conjunction with the accompanying drawings.

DETAILED DESCRIPTION

The invention will now be described in detail with reference to the drawings showing an embodiment thereof. In the embodiment, a tape processing device according to the invention is applied to a tape printing apparatus which is capable of printing desired characters and figures on a strip of printing tape and cutting off a printed portion of the printing tape to a predetermined length. The cut-off piece of the printing tape is used as a label to be affixed to a file cabinet or the like. That is, the tape printing apparatus makes a label printed with characters and figures from a strip of plain printing tape.

Figure 1:
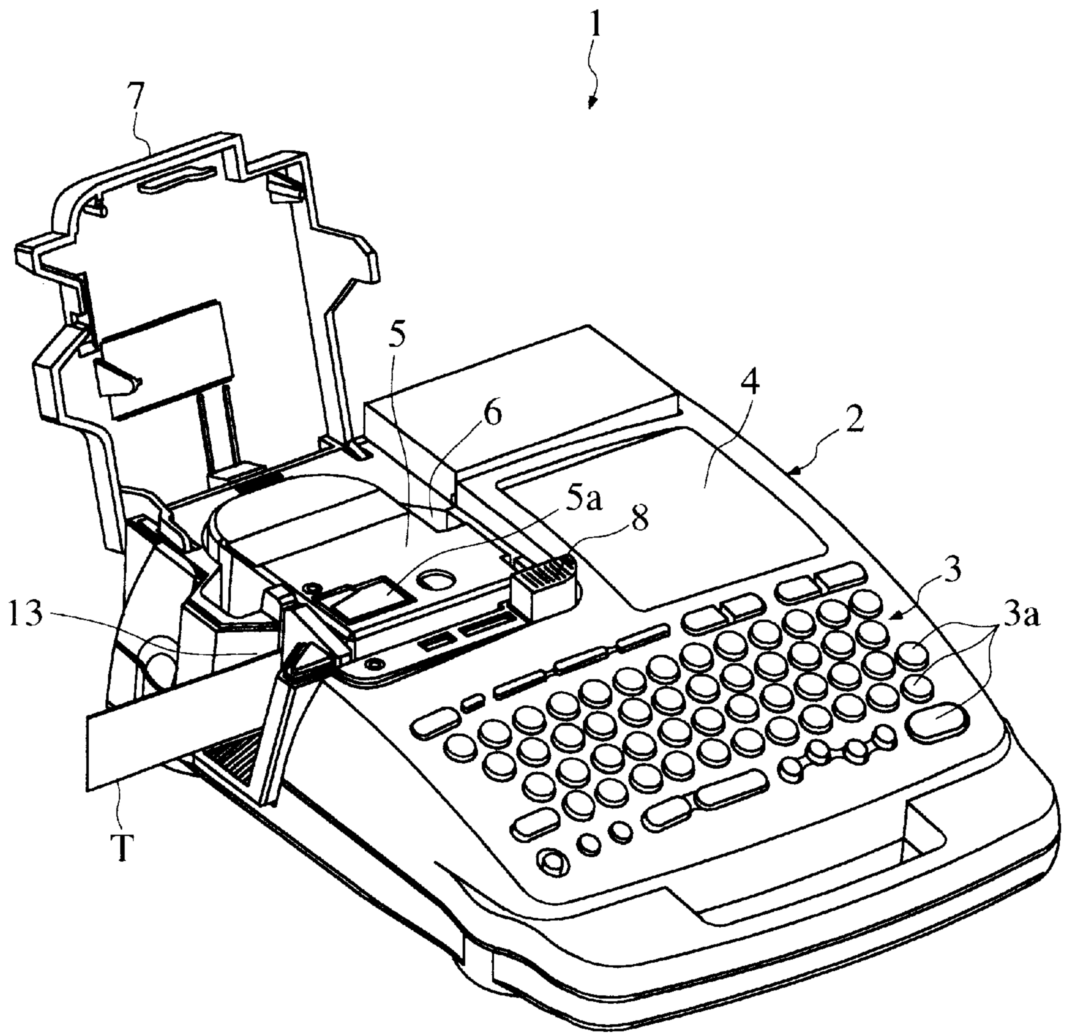
FIG. 1 is a perspective view of an appearance of a tape printing apparatus incorporating a tape processing device according to an embodiment of the invention.
Figure 2:
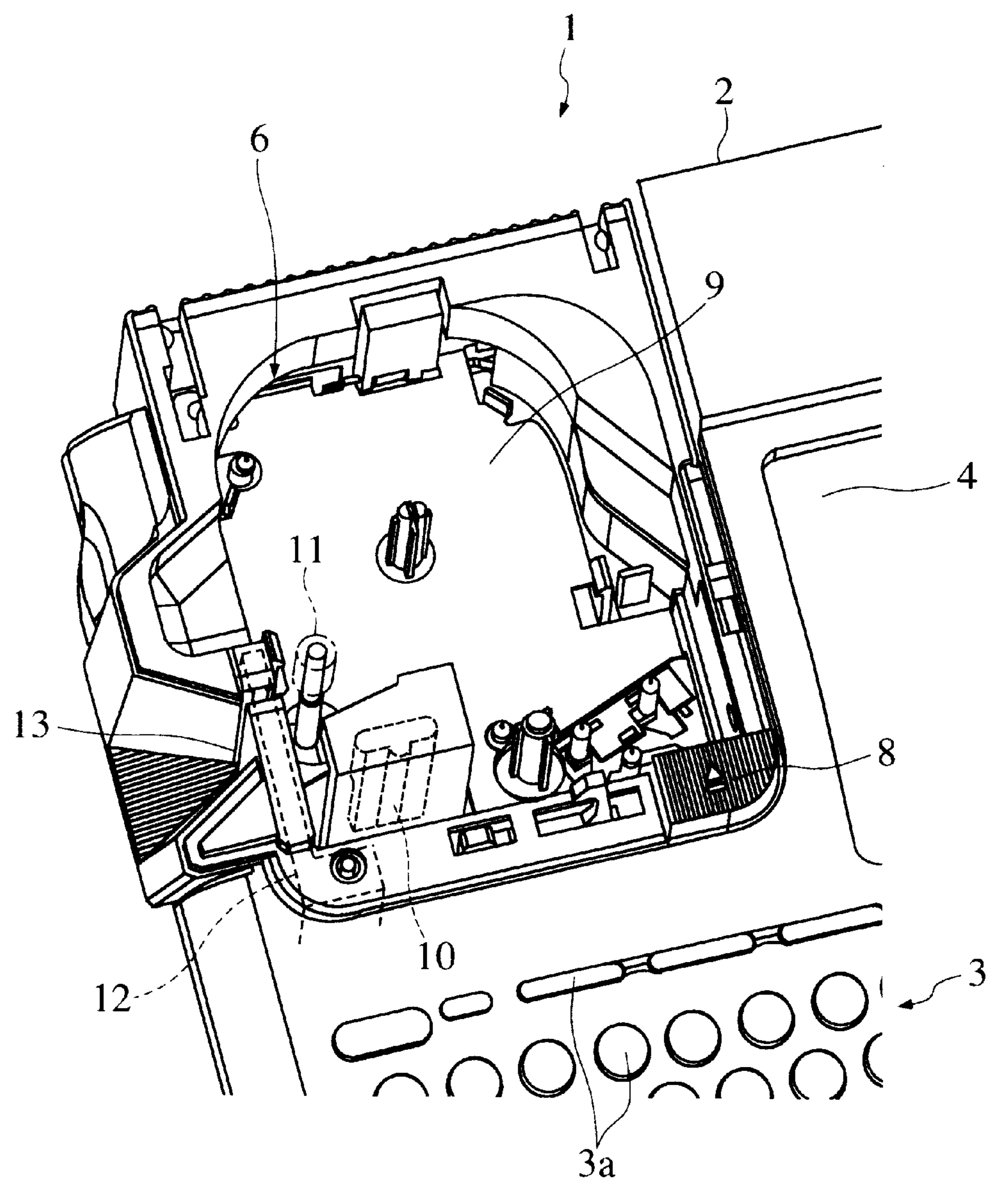
FIG. 2 is a perspective view showing a compartment of the tape printing apparatus with a lid removed therefrom, and component parts associated with the compartment.

Referring first to FIGS. 1 and 2, the tape printing apparatus 1 includes a casing 2 having upper and lower divisional portions, a key input block 3 arranged in a front part of the casing 2, a display 4 arranged in a right-side rear portion of the same, as viewed in FIG. 1, and a compartment 6 arranged in a left-side rear portion of the same, as viewed in FIG. 1, for receiving therein a tape cartridge 5. The compartment 6 has a lid 7 for opening and closing the same, which is formed with a window. In a corner of the compartment 6, at a location corresponding to a corner of the lid 7, there is provided an opening button 8 for opening the lid 7. The compartment 6 integrates an ejection device 9 for receiving the tape cartridge 5 into the compartment 6 and causing the received tape cartridge 5 to rise to a position from which it can be taken out with ease.

Further, a print head 10 is arranged within the compartment 6 for extending through a rectangular opening 5*a* of the tape cartridge 5, while a platen roller 11 is arranged within the tape cartridge 5 at a location to be opposed to the print head 10 when the tape cartridge 5 is loaded in the compartment. The printing tape T is rolled out from the tape cartridge 8 by the platen roller 11, printed by the print head 10, and further sent out of the apparatus 1. In the casing 2, an automatic cutting device 12 is arranged on a left side of the print head 10 as viewed in FIG. 2. After the feeding of the tape T is stopped, the tape T is cut to a predetermined length (printed portion+leading and trailing marginal areas) by the automatic cutting device 12. Further, at a left-side portion of the casing 2, as viewed in FIG. 2, there is formed a tape exit 13 at a location adjacent to the automatic cutting device 12, via which the tape T is sent out of the apparatus 1.

When a label is made from the tape T by the use of this tape printing apparatus 1, first, the opening button 8 is pushed or depressed to let the lid 7 pop up, and then the lid 7 is fully opened by hand (see FIG. 1). The tape cartridge 5 is set on the ejection device 9 in the compartment 6 and pushed downward to a fully-inserted position within the compartment 6. When the tape cartridge 5 is loaded, the lid 7 is closed. Then, keys 3*a* of the key input block 3 are operated while these keyed inputs being viewed or confirmed via the display screen of the display 4, whereby desired characters and/or figures are entered. When it is confirmed through the display screen that the desired characters and/or figures are entered, a key 3*a* is operated to instruct the apparatus to execute printing of the entered characters/or figures.

When a command for printing is issued, the tape T and an ink ribbon, not shown, in the tape cartridge 5 start running simultaneously, and the printing is carried out by thermal transfer of ink. As the printing process proceeds, the ink ribbon is taken up into a roll within the tape cartridge 5, whereas the printed portion of the tape T is sent out of the apparatus 1 via the tape exit 13. After the printing is completed, the tape T is further advanced for providing a trailing marginal area to the printed portion, and then the feeding of the tape T and the ink ribbon is stopped. Then, the automatic cutting device 12 is started to automatically cut the tape T. In removing the tape cartridge 5 from the apparatus 1, first, the opening button 8 is pushed or depressed to let the lid 7 pop up and then the lid 7 is fully opened by hand, whereupon the ejection device 9 operates in a manner linked with the opening operation of the lid 7, whereby the tape cartridge 5 is pushed upward to the position where it was set on the ejection device 9.

The tape T is a so-called peel-off paper-backed adhesive tape. The top of the tape T is surface-treated for an excellent ink-spreading property, while the bottom of the same is coated with an adhesive to provide an adhesive layer which is covered by a peel-off paper. Therefore, the cut-off piece printed with characters and/or symbols can be affixed to a desired object as a label by removing the peel-off paper therefrom. The tape printing apparatus 1 is provided with several kinds of tapes (ink ribbons) T, with various tape widths e.g. of 6 mm, 9 mm, 12 mm, 18 mm, 24 mm and 36 mm, each of which is supplied as a roll received within a tape cartridge 5.

Next, the automatic cutting device 12 will be described in detail with reference to FIGS. 3 and 4. The automatic cutting device 12 includes a cutter motor 21 as a drive source, a cutter-actuating mechanism 22 driven by the cutter motor 21, and a cutter 23 having a fixed blade 23*a* and a movable blade 23*b* (tape-cutting blades) which is actuated by the cutter-actuating mechanism 22 for a cutting operation. Further, a static eliminator brush 24 is arranged on an outer surface of the fixed blade 23*a*, for eliminating static electricity from the tape T, while a reservoir (oil-storing member) 25 is arranged on an inner surface of the fixed blade 23*a*, for holding silicone oil therein. Silicone oil is employed for preventing the adhesive of the tape T from adhering to the cutter 23, and supplied from the reservoir 25 for automatic application on the fixed blade 23*a* and the movable blade 23*b*. These components of the automatic cutting device 12 are supported by the frame 26 in an L-shaped arrangement such that they surround the tape cartridge 5 loaded in the compartment 6 and the ejection device 9 on two sides.

Figure 3:
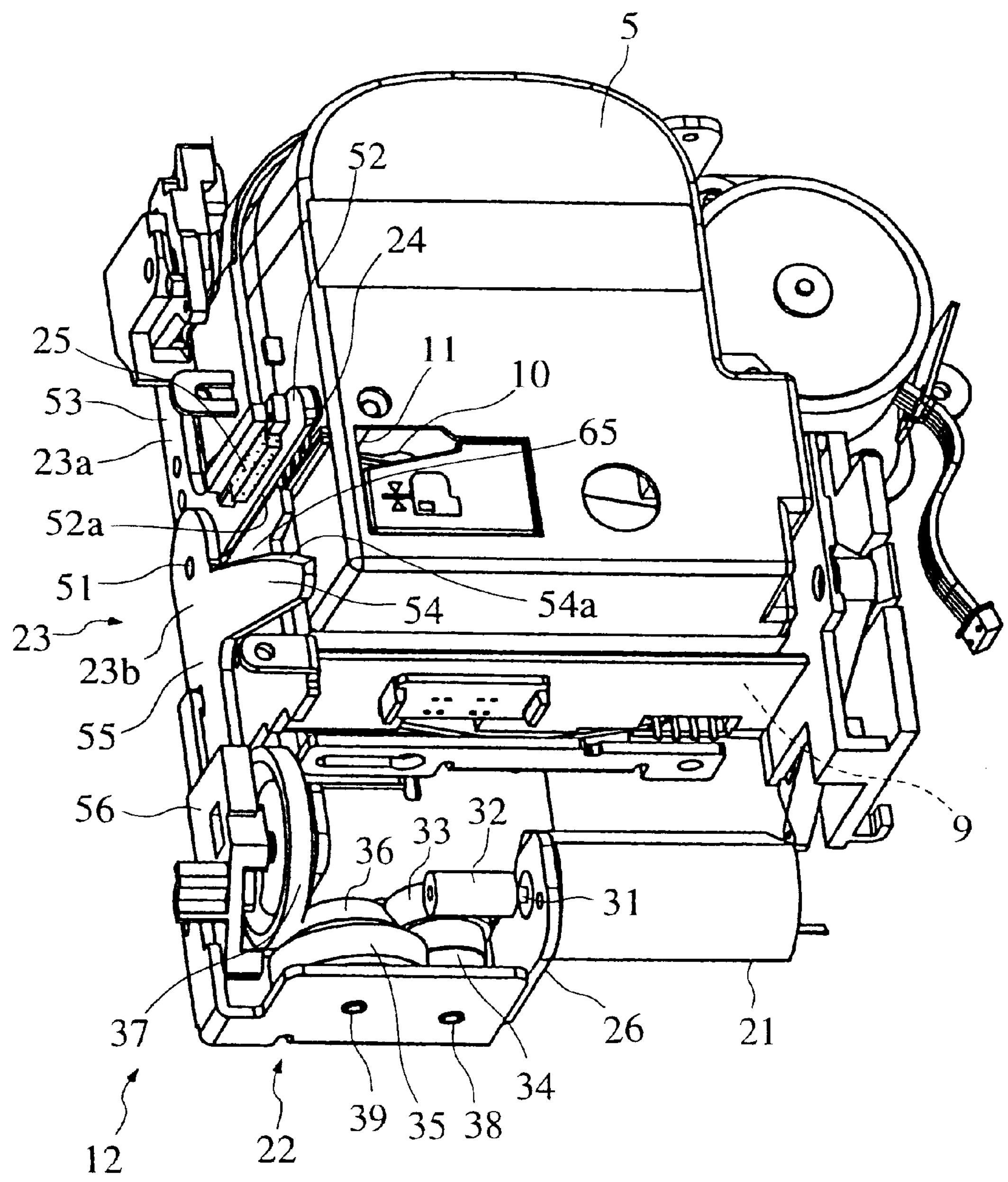
FIG. 3 is a perspective view showing an automatic cutting device of the tape printing apparatus and component parts associated therewith.
Figure 4:
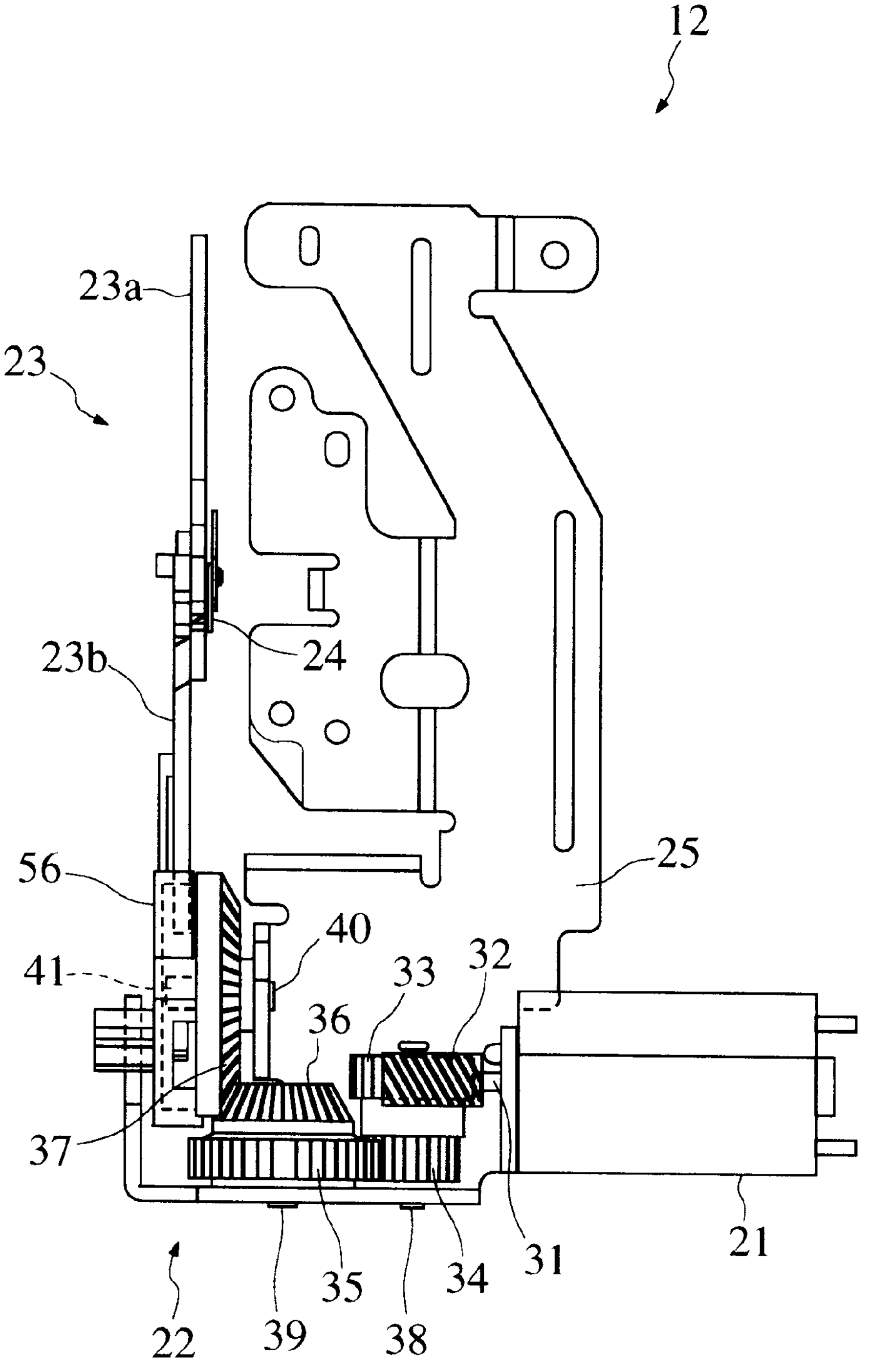
FIG. 4 is a plan view of the automatic cutting device.

The cutter motor 21 is arranged in front of a right-side portion of the tape cartridge 5, as viewed in FIG. 3. The cutter motor 21 starts rotating in synchronism with the stop of rotation of the aforementioned platen roller 11 to thereby cause the cutter 23 to perform the cutting operation. A worm 32 is rigidly fitted on a drive shaft 31 of the cutter motor 21, for transmitting torque from the cutter motor 21 to the cutter-actuating mechanism 22.

The cutter-actuating mechanism 22 is comprised of a worm wheel 33 mating with the worm 32, a first intermediate gear 34 arranged coaxial with the worm wheel 33, a second intermediate gear 35 mating with the first intermediate gear 34, a first bevel gear 36 arranged coaxial with the second intermediate gear 35, and a second bevel gear 37 mating with the first bevel gear 36. The worm wheel 33 and the first intermediate gear 34 are fixed to each other and rotatably supported by a first support shaft 38 supported on the frame 26 in a cantilever manner. Similarly, the second intermediate gear 35 and the first bevel gear 36 are fixed to each other and rotatably supported by a second support shaft 39 supported on the frame 26 in a cantilever manner. Further, the second bevel gear 37 is also rotatably supported by a third support shaft, not shown, supported on the frame 26 in a cantilever manner.

Fixed to a side of the second bevel gear 37 is an eccentric pin, not shown, which is engaged in an elongate groove, not shown, formed in a movable blade holder 56 referred to hereinafter. That is, the second bevel gear 37 and the movable blade holder 56 form a crank mechanism for rotating the movable blade 23*b*. When the cutter motor 21 is driven for rotation, the torque or rotational driving force generated thereby is reduced in rotational speed by a reduction gear train from the worm 32 to the first bevel gear 36 to rotate the second bevel gear 37. When the second bevel gear 37 rotates, the eccentric pin performs an eccentric angular movement while sliding within the elongate groove to thereby actuate the movable blade 23*b* by way of the movable blade holder 56 to cause the same to cut the tape T by scissors-like action.

The cutter 23 is comprised of the fixed blade 23*a* and the movable blade 23*b* pivotally connected by a support shaft 51, and arranged in a narrow space between the tape cartridge 5 and the tape exit 13. The fixed blade 23a is L-shaped with a perpendicular portion 52 formed with a cutting edge 52*a* linear or straight in profile, and a horizontal portion 53 fixed to the frame 26, for holding the perpendicular portion 52. Similarly, the movable blade 23*b* has an inclined portion 54 formed with a cutting edge 54*a* arcuate in profile, a rotary portion 55 supporting the inclined portion 54, and the movable blade holder 56 mounted on a tail end portion of the rotary portion 55. The above-mentioned elongate groove formed in the movable blade holder 56 engages the eccentric pin of the second bevel gear 37. The fixed blade 23*a* and the movable blade 23*b* are opposed to each other, with respective semicircular portions through which the support shaft 51 extends, disposed one upon the other. When the movable blade 23*b* rotates about the support shaft 51, the cutting edge 54*a* of the movable blade 23*b* slides past the cutting edge 52*a* of the fixed blade 23*a* to thereby perform the cutting operation.

The fixed blade 23*a* is arranged on the tape cartridge 5 side, whereas the movable blade 23*b* on the tape exit 13 side. The tape T rolled out from the tape cartridge 5 and advanced straight to the tape exit 13 faces the cutting edge of the fixed blade 23*a* in line therewith and proximate thereto (see FIG. 7). When the movable blade 23*b* rotates in this state of the tape T, the tape T is caught between the fixed blade 23*a* and the movable blade 23*b* and cut off thereby, followed by the cut-off piece of the tape T falling off from the tape exit 13.

Figure 8:
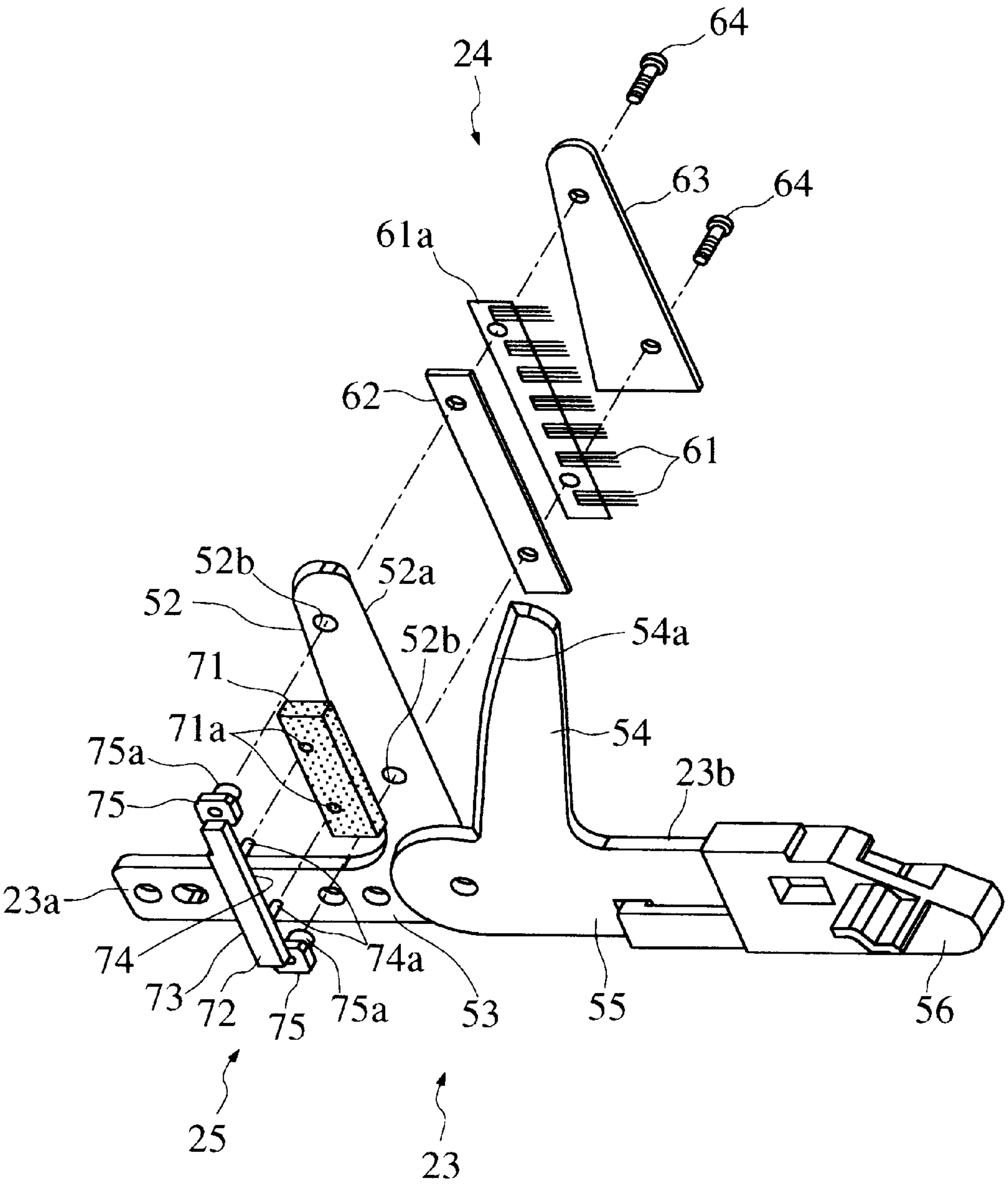
FIG. 8 is an exploded perspective view of the cutter.
Figure 9:
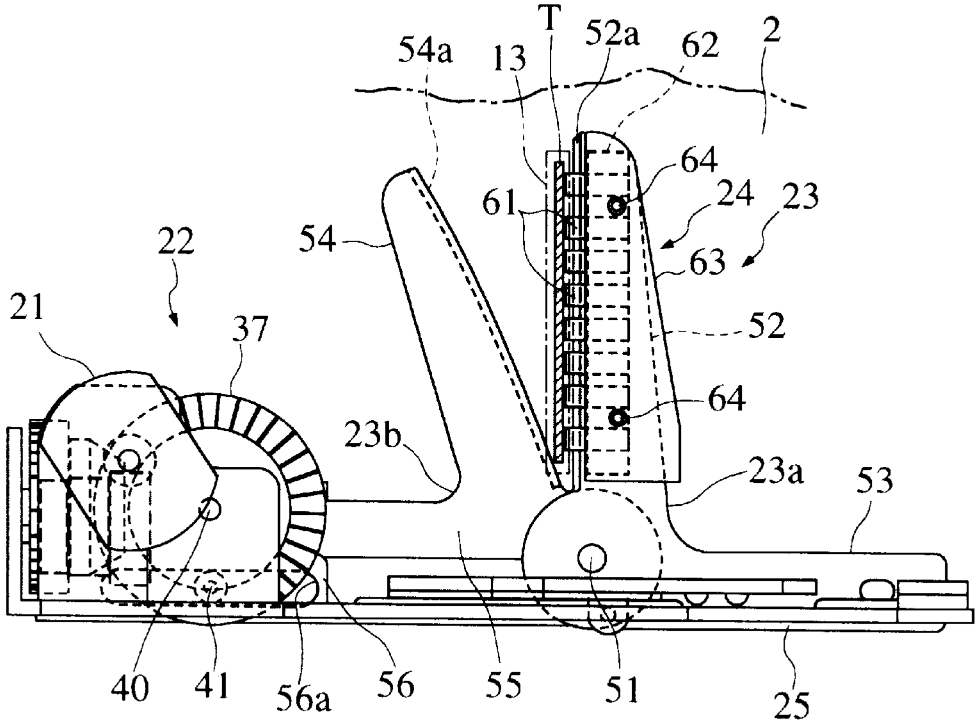
FIG. 9 is a rear view of the automatic cutting device.
Figure 10:
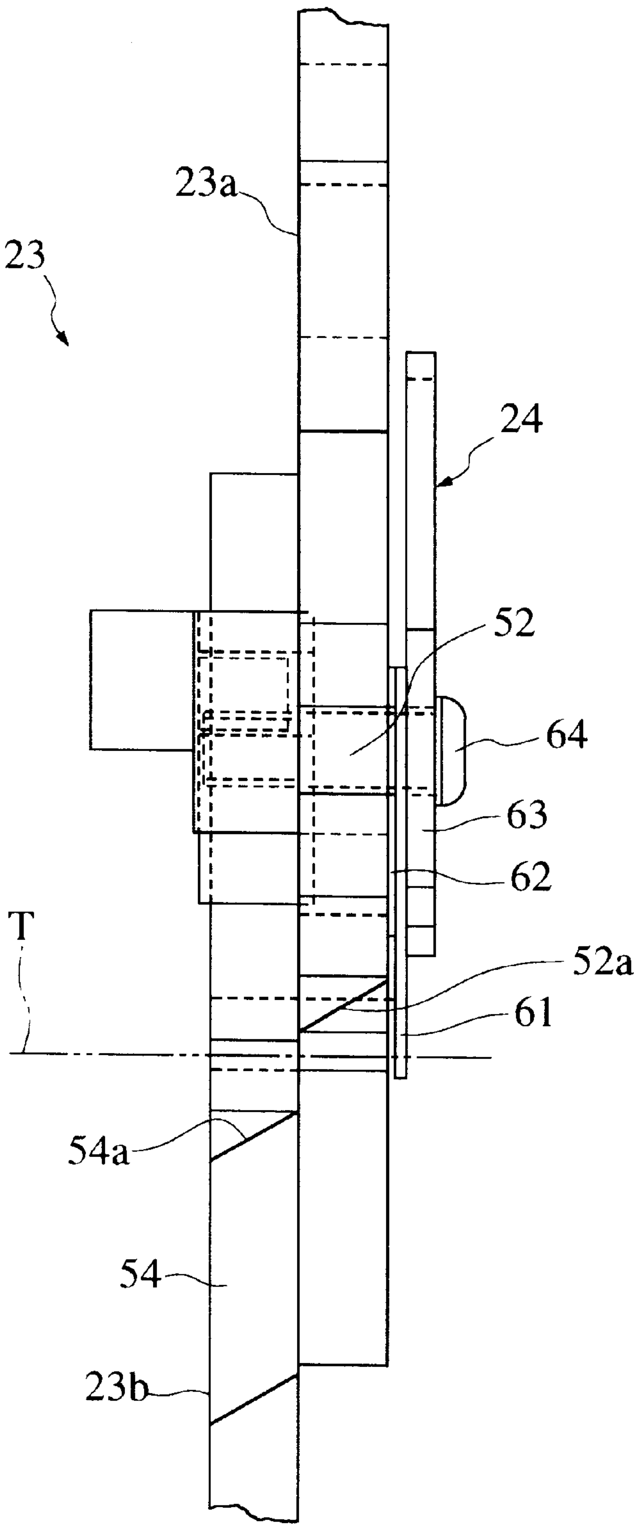
FIG. 10 is an enlarged partial plan view of the cutter.
Figure 11:
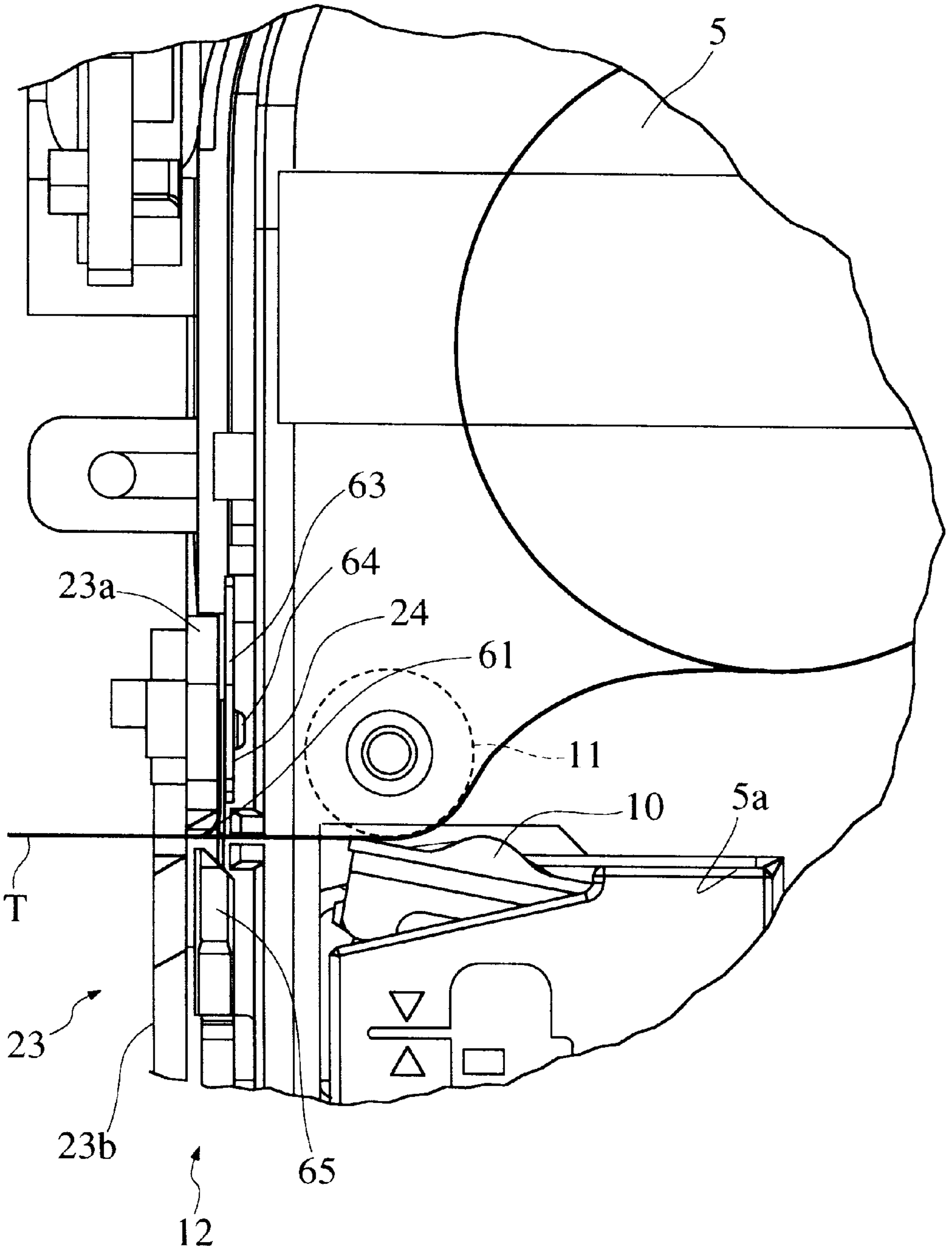
FIG. 11 is an enlarged partial plan view of the automatic cutting device and component parts associated therewith.

The static eliminator brush 24 is mounted on an outer surface of the perpendicular portion 52 of the fixed blade 23*a* as shown in FIGS. 8 to 10. The static eliminator brush 24 is comprised of a plurality of static eliminating elements 61 each formed of a bundle of thousands of carbon fibers (static eliminator strands) and attached to a brush base 61a, a brush receiver 62 and a brush retainer 63 for cooperatively sandwiching the static eliminating elements 61 therebetween, and a pair of screws 64 for fixing these component parts to respective upper and lower portions of the perpendicular portion 52 of the fixed blade 23*a*. The static eliminator brush 24 and the reservoir 25 are fixed to opposite side surfaces of the perpendicular portion 52 of the fixed blade 23*a* by the two screws 64 in a manner sandwiching the same therebetween, as will be described in further detail. As best shown in FIG. 11, reference numeral 65 designates a guide for guiding the tape T as it runs by holding the same against the urging force of the static eliminator brush 24 applied to the tape T from an opposite side. This guide 65 is arranged at a location opposed to the cutting edge 52*a* of the fixed blade 23*a* such that a portion of the tape T brought to the fixed blade 23*a* is positioned between the guide 65 and the cutting edge 52*a* of the fixed blade 23*a*.

The static eliminating elements 61 are arranged in parallel with the width of the tape T facing the fixed blade 23*a* at equal intervals such that each of them slightly projects over the cutting edge 52*a* of the fixed blade 23*a*. The width of the whole vertical arrangement of the static eliminating elements 61 is set based on the maximum width (36 mm) of the tape T so as to enable the cutter to deal with all types of tapes T. The static eliminator brush 24 can be formed at a low cost with no static-eliminating performance penalty by preparing bundles of carbon fibers (static eliminator strands) and arranging them at regular intervals.

The brush base 61*a*, the brush receiver 62, and the brush retainer 63 are all formed of conductive materials. More specifically, the brush base 61a and the brush receiver 62 are formed e.g. of an aluminum film coated with a conductive adhesive, and the brush retainer 63 is formed of a stainless steel plate. The brush receiver 62 having a rectangular shape is arranged on the outer surface of the fixed blade 23*a* in parallel with the cutting edge 52*a* of the same, and has the static eliminating elements 61 attached thereto together with the brush base 61a by an adhesive. The bush retainer 63 is pressed against the perpendicular portion 52 of the fixed blade 23*a* by fixing the bush receiver 62, the static eliminating elements 61 on the brush base 61*a*, and the brush retainer 63 to the perpendicular portion 52 of the fixed cutting blade 23*a* by the screws 64. The aforementioned guide 65 is formed e.g. of a resin.

According to this arrangement, the tape T running out of the device is always in sliding contact with the static eliminating elements 61 of the static eliminator brush 24, whereby static electricity charged on the tape T can be suitably and fully eliminated therefrom. Further, since the static eliminating elements 61 are strongly pressed against the perpendicular portion 52 of the fixed blade 23*a*, the static electricity eliminated from the tape T is grounded without conduction failure. Further, the tape T in contact with the static eliminator brush 24 is held by the guide 65, and hence the contact between the static eliminator brush 24 and the tape T is made stable, enabling positive and reliable elimination of static electricity from the tape T. Moreover, static electricity generated by friction of the tape T with the movable blade 23*b* during the cutting action of the movable blade 23*b* can be easily eliminated.

The tape thus eliminated of static electricity and cut off to the predetermined length is freely dropped from the tape exit 3. Therefore, no static electric is generated after the cutting operation, so that the tape T without electric charge is delivered from the device. As a result, the cut-off piece of the tape T no longer adheres to the cutter 23 or the tape exit 13 by action of static electricity, whereby it is possible to positively prevent re-cutting and jamming of the cut-off piece of the tape T.

Figure 5:
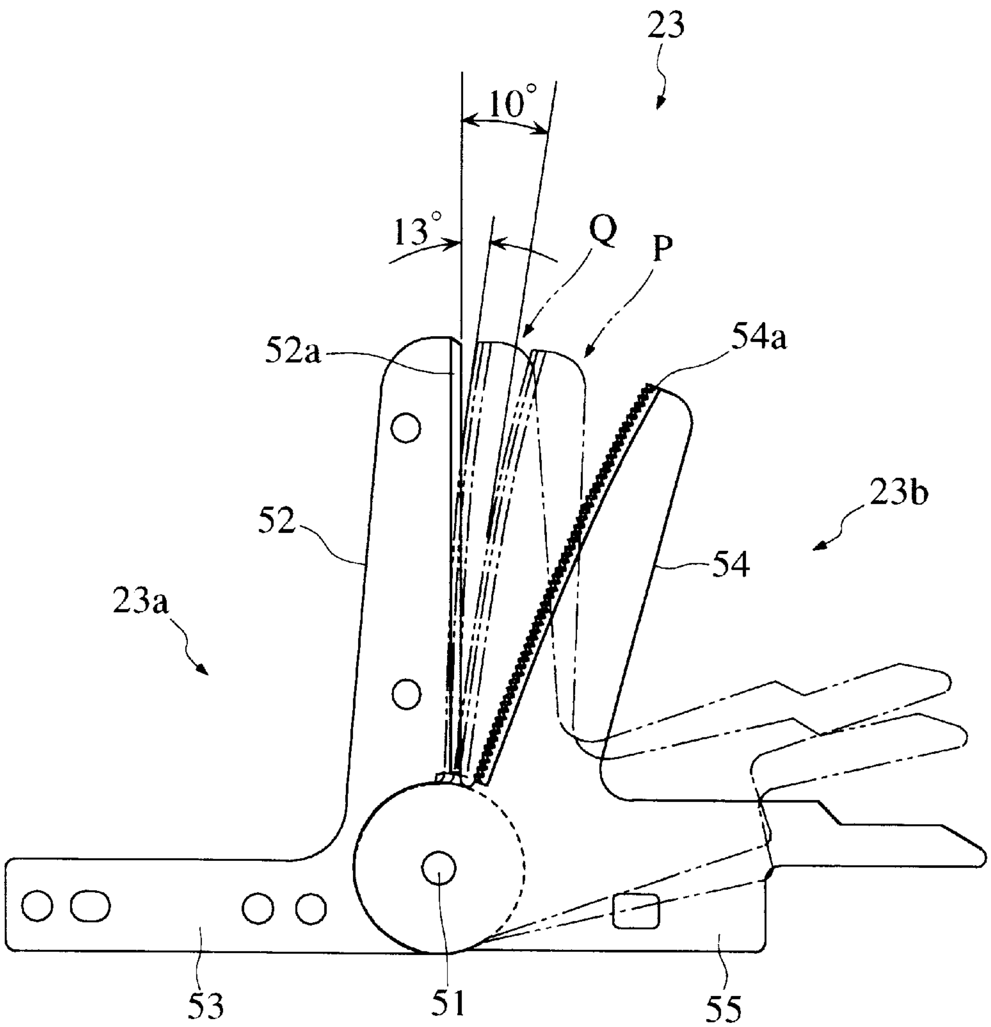
FIG. 5 is a front view of a cutter of the automatic cutting device and component parts associated therewith.

As shown in FIG. 5, the perpendicular portion 52 of the fixed blade 23*a* is formed with the cutting edge 52*a* having a generally straight profile, while the inclined portion 54 of the movable blade 23*b* is formed with the cutting edge 54*a* having a generally arcuate profile which is curved outward in a cutting direction. The cutting edge 54*a* of the movable blade 23*b* is saw-toothed as shown in FIG. 5. Positions P and Q indicated by two-dot chain lines in FIG. 5 correspond to a starting point and a terminating point of the cutting operation of the movable blade 23*b*, respectively, assuming that the tape T having the width of 36 mm is cut off. Since the cutting edge 54*a* of the movable blade 23*b* is formed arcuate (with 300 R), the cutting edge angle formed at the point P between the cutting edge 52*a* of the fixed blade 23*a* and the cutting edge 54*a* of the movable blade 23*b* is approximately 10 degrees, while the cutting edge angle at the point Q is approximately 13 degrees. That is, as the cutting of the tape T proceeds (the tape T is cut deeper), the cutting edge angle is progressively increased. This reduces the resistance of the tape T to the cutting action, whereby the cutting torque required can be reduced. Naturally, as the edge-to-edge crossing point (point of action or working point) between the blades is made farther from the support shaft 51 (fulcrum), there should be an increase in the cutting torque required. However, this increase can be canceled by the reduction of the same by the effects of the arcuate shape of the cutting edge 54*a*, whereby variation in torque can be reduced as a whole. Therefore, the cutter motor 21 can be implemented by a small output power type.

Figure 6:
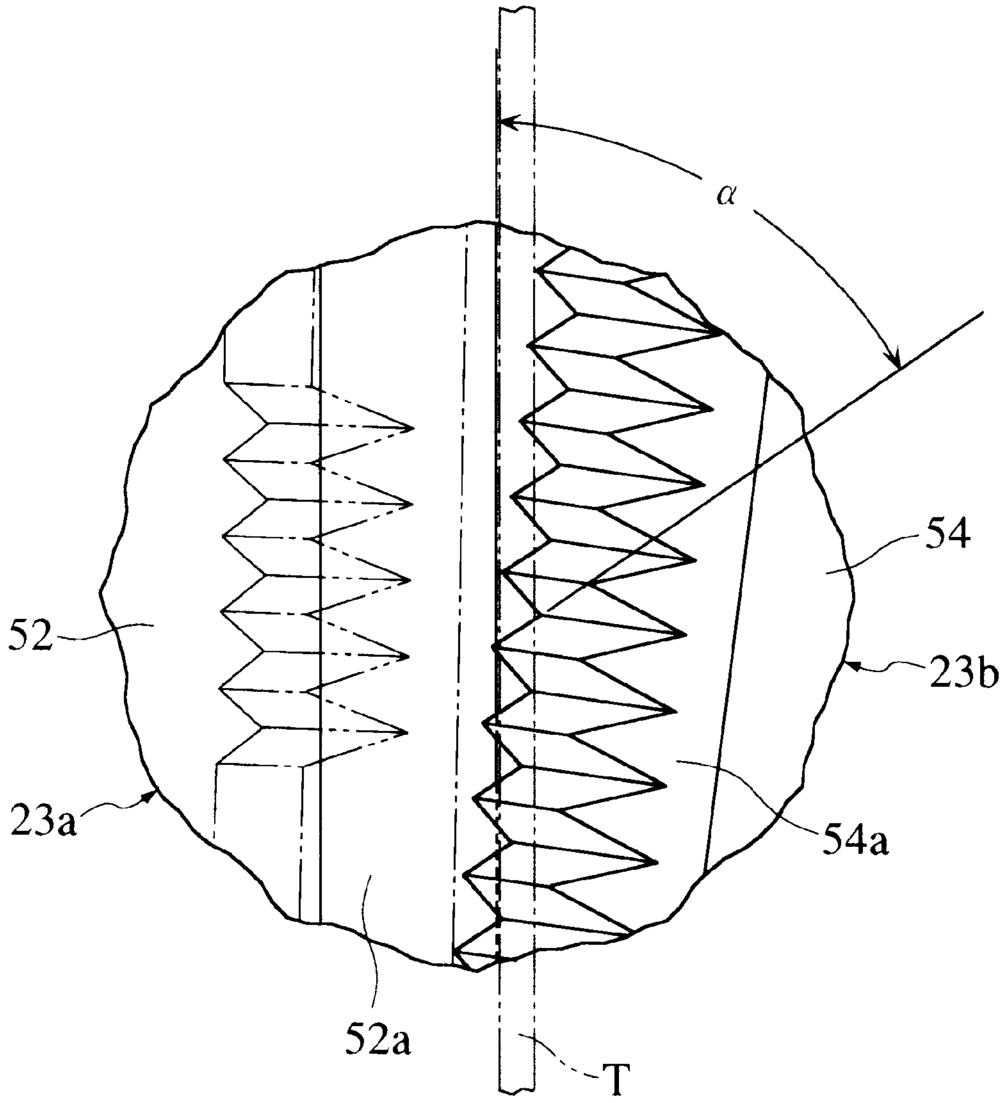
FIG. 6 is an enlarged partial front view of a movable blade of the cutter.

Further, since the cutting edge 54*a* of the movable blade 23*b* is saw-toothed, and as shown in FIG. 6, each tooth of the saw-toothed cutting edge forms a larger cutting edge angle ($\alpha$), which reduces the resistance of the tape T to cutting action of the movable blade 23*b*. Therefore, the torque required in cutting the tape T can be made smaller by this feature of the present embodiment, as well. Moreover, when the tape T is cut by the movable blade 23*b*, pointing edges of teeth of the cutting edge 54*a* bite in the tape, so that the tape T is prevented from being pushed upward by the movable blade 23*b*, and from being cut in a state shifted upward to form a diagonally arcuate end of the cut-off piece.

Although in the above embodiment, the cutting edge of the movable blade is formed such that it is arcuate, this is not limitative but, the cutting edge of the fixed blade may be arcuate instead, or both the blades may be formed with cutting edges arcuate in profile. In such a case, it is preferred that both the blades are operated through a linkage for simultaneous rotation with the tape positioned therebetween. Further, both the fixed blade and the movable blade may have a straight cutting edge, with one of them being saw-toothed.

Figure 7:
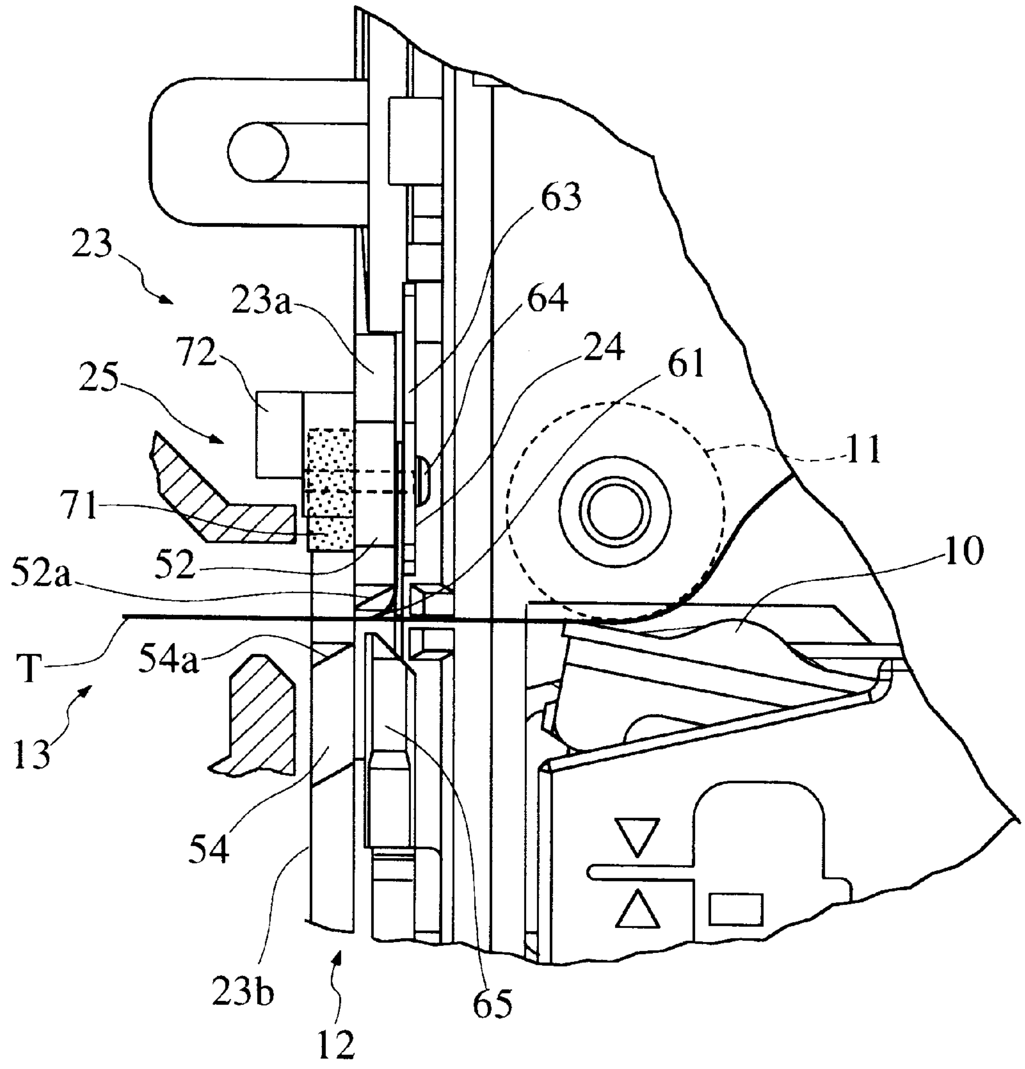
FIG. 7 is an enlarged plan view showing the cutter and component parts associated therewith.

Referring to FIGS. 7 and 8, the reservoir 25 is comprised of an oil absorber (absorber of adhesion-preventing liquid) 71 for holding silicone oil absorbed therein, and an oil absorber holder 72 for arranging the oil absorber 71 along the fixed blade 23*a*. The oil absorber 71 is formed e.g. of a foamed cellulose, so that it has amoderate liquid-holding power which prevents absorbed silicone oil from dripping and at the same time permits the same to readily ooze out, as well as a moderate elasticity which permits the oil absorber 71 to be brought into suitable contact with the movable blade 23*a*. Although the foamed cellulose is preferred for the oil absorber 71, this is not limitative, but foamed urethane or felt may be employed instead. Further, silicone oil may be replaced by any other suitable fat or oil. Fats and oils which are not volatile but moderate in viscosity with temperature-resistant properties are preferable.

The oil absorber holder 72 is made of a resin or the like, which is provided with a holder body 73 having an inner side formed with a receiving groove 74 for receiving the oil absorber 71 and a pair of holder body-attaching legs 75, 75 provided at respective upper and lower ends of the holder body 73 for attaching the holder body 73, to the fixed blade 23*a*. The oil absorber holder 72 has its attaching legs 75, 75 fixed to the inner side of the perpendicular portion 52 of the fixed blade 23*a* with one half portion of the oil absorber 71 received in the receiving groove 74. The attaching legs 75 each have a thread portion 75*a* protruding inward and formed with an internal thread, and the thread portion 75*a* is inserted into a through hole 52*b* formed through the perpendicular portion 52. In this state, the aforementioned screws 64 for fixing the static eliminator brush 24 are screwed respectively into the internal threads of the thread portions 75*a* from the static eliminator brush side, whereby the static eliminator brush 24 and the oil absorber holder 72 (reservoir 25) are fixed to the perpendicular portion 52 of the fixed blade 23*a* by the same screws 64.

The receiving groove 74 is open at one side facing toward the movable blade 23*b* and closed at the other side opposite thereto. Further, the receiving groove 74 has a pair of projections 74*a*, 74*a*, formed at respective upper and lower locations, for being fitted into corresponding engaging holes 71*a*, 71*a* formed in the oil absorber 71. One end of the oil absorber 71 abuts a wall of the receiving groove 74 at the closed side, whereby the oil absorber 71 is immovably retained in the receiving groove 74. Thus, the oil absorber 71 is fixed on the perpendicular portion 52 of the fixed blade 23*a* by the oil absorber holder 72 such that the other half portion of the oil absorber 71 on the movable blade 23*b* side is uncovered or exposed and the one half portion of the same is received within the receiving groove 74 of the oil absorber holder 72.

The uncovered portion of the oil absorber 71 is arranged at a location where it comes into contact with the cutting edge 54*a* (of the inclined portion 54) of the movable blade 23*b* when it performs the cutting operation. Since the cutting edge 54*a* of the inclined portion 54 has the arcuate profile, when the movable blade 23*b* performs the cutting operation, a vertically intermediate portion of the inclined portion 54 protrudes most toward the oil absorber 71 than any other portion of the inclined portion 54. Therefore, the oil absorber 71, i.e. the reservoir 25, is arranged at a vertically intermediate portion of the perpendicular portion 52 of the fixed blade 23*a*. This causes only the vertically intermediate portion of the cutting edge 54*a* of the inclined portion 54 of the movable blade 23*b* to be brought into light urging contact with the reservoir 71, thereby preventing an excessively large amount of silicone oil from attaching to the movable blade 23*b*. Further, when (the perpendicular portion 52 of) the fixed blade 23*a* and (the inclined portion 54 of) the movable blade 23*b* are brought to an overlapping position by the cutting operation, silicone oil is diffused by capillary action to automatically spread over the inner surfaces and the cutting edges 52*a*, 54*a* of the fixed and movable blade 23*a*,23*b* to which the adhesive of the tape T is liable to adhere. On the other hand, although the movable blade 23*b* is brought into contact with a cut end face of the tape T when it returns to its original position after the cutting action, the amount of the silicone oil attached or coated on the movable blade 23*b* is small, and hence the attaching of a large amount of silicone oil to the cut end of the tape T can be prevented.

As described above, according to the present embodiment, silicone oil supplied from the reservoir 25 is applied to the inner sides of the blades of the fixed and movable blades 23*a*, 23*b* and the cutting edges 52*a*, 54*a* of the same to which the adhesive of the tape T is liable to adhere, whereby neither the adhesive of the tape T nor the cut-off piece of the tape T which is cut off together with its adhesive adheres to the fixed blade 23*a* or the movable blade 23*b*. As a result, it is possible to effectively prevent the automatic cutting device 12 from being disabled for the cutting operation due to the adhesive adhering to the cutting blades, and the cut-off piece of the tape T from being jammed into the tape exit 13 or being cut again. Further, silicone oil adhering to the fixed blade 23*a* and the movable blade 23*b* not only acts as a rust preventive but also as a lubricant by spreading into areas of the support shaft 51 rotatably supporting the blades 23*a*, 23*b*.

Although in the above-mentioned embodiment, silicone oil is held in the reservoir, this is not limitative, but a mere coating of silicone oil to the fixed blade and the movable blade may be useful. Results of experiments in this respect teach that provision of a reservoir maintains an appropriate coating or application of the oil on the cutting blades until the blades perform the cutting operation approximately fifty thousand times, while a mere coating or application of silicone oil maintains the appropriate coating or application of oil until the blades perform the cutting operation twenty thousand times. Further, although in the embodiment described above, the description is made of the cutter of scissors type, it goes without saying that this invention can be also applied to other forms of cutters (of tape processing devices) which are occasionally or often used for cutting adhesive tapes.

Although in the above embodiment, the description is made of a case in which the static eliminator brush is mounted on the motor-driven cutter, this is not limitative but the static eliminator brush may be mounted on a hand-operated cutter.

It is further understood by those skilled in the art that the foregoing are preferred embodiments of the invention, and that various changes and modification may be made without departing from the spirit and scope thereof.

What is claimed is:

1. A tape processing device comprising:

a feed device for feeding a tape having a layer of an adhesive;

a cutter assembly for cutting the tape, the cutter assembly having a first and a second cutting blade each defining an inner surface and a cutting edge, the first cutting blade being fixed and the second cutting blade being movable relative to the first cutting blade between a first position before a cutting operation and a second position after the cutting operation, the inner surfaces of the first and second cutting blades facing and at least partly contacting each other when the second cutting blade is in the second position; and a coating device including a reservoir for containing an adhesion-preventing liquid, the reservoir being fixedly disposed with respect to the first cutting blade and contacting the cutting edge of the second cutting blade when the second cutting blade is in the second position, the reservoir being operable to dispense the adhesion-preventing liquid when contacted by the cutting edge of the second cutting blade, whereby the adhesion-preventing liquid is diffused by a capillary action and coats the inner surfaces of the first and second cutting blades when the second cutting blade is in the second position.

2. A tape processing device according to claim 1, wherein said reservoir includes an adhesion-preventing liquid absorber for absorbing and holding said adhesion-preventing liquid.

3. A tape processing device according to claim 2, wherein said adhesion-preventing liquid absorber is arranged at a location where said cutting edge of said movable blade for performing cutting operation is brought into slight contact with said another half portion of said adhesion-preventing liquid absorber, which is uncovered.

4. A tape processing device according to claim 1, wherein said reservoir further includes a holder for holding said adhesion-preventing liquid absorber on said fixed blade, said holder fixedly holding a half portion of said adhesion-preventing liquid absorber, with another half portion of said adhesion-preventing liquid absorber on a movable blade side being uncovered.

5. A tape processing device according to claim 1, wherein said adhesion-preventing liquid absorber is formed of a foamed cellulose.

6. A tape processing device according to claim 1, wherein said adhesion-preventing liquid is silicone oil.

7. A tape processing device according to claim 1, wherein said at least one cutting blade of said cutter assembly comprises a fixed blade and a movable blade, said fixed blade and said movable blade each having a cutting edge and cooperatively performing a cutting operation by sliding of said cutting edge of said movable blade past said cutting edge of said fixed blade, at least one of said cutting edge of said fixed blade and said cutting edge of said movable blade has a saw-toothed shape.

8. A tape processing device comprising:

a feed device for feeding a tape having a layer of an adhesive; and a cutter assembly for cutting said tape, said cutter assembly having a fixed blade and a movable blade each having a cutting edge and cooperatively performing a cutting operation by sliding of said cutting edge of said movable blade past said cutting edge of said fixed blade, wherein at least one of said cutting edges of said fixed and movable blades is curved to have an outward curvature in a direction of said cutting operation, and wherein an angle formed between said cutting edges of said fixed and movable blades at an intersecting point of the cutting edges progressively increases from about 10 degrees at a starting position to about 13 degrees at a terminating position of the cutting operation.

9. A tape processing device according to claim 8, wherein said cutting edge of said fixed blade and said cutting edge of said movable blade are designed to form a cutting edge angle therebetween which progressively increases as said tape is cut deeper.

10. A tape processing device according to claim 8, including a frame, said fixed blade being fixed to said frame, said cutting edge of said fixed blade having a straight profile, said cutting edge of said movable blade having a curved profile.

11. A tape processing device according to claim 10, wherein said curved profile of said cutting edge of said movable blade is generally arcuate.

12. A tape processing device according to claim 10, wherein said cutting edge of said movable blade has a saw-toothed shape.

13. A tape processing device comprising:

a feed device for feeding a tape having a layer of an adhesive;

a cutter assembly for cutting said tape, said cutter assembly having a plurality of cutting blades including a fixed blade and a moveable blade cooperatively performing a cutting operation; and a static eliminator brush fixed to said fixed blade, the static eliminator brush being in continuous contact with the tape during the feeding of the tape through the cutter assembly.

14. A tape processing device according to claim 13, including a tape exit for delivering a cut-off portion of said tape therefrom, said cutter assembly being arranged immediately close to said tape exit.

15. A tape processing device according to claim 14, wherein a region of the static eliminator brush extends across the tape exit.

16. A tape processing device according to claim 13, wherein said static eliminator brush is grounded via said cutter assembly.

17. A tape processing device according to claim 13, wherein said static eliminator brush is fixed to said fixed blade in a state pressed against a surface of said fixed blade.

18. A tape processing device according to claim 17, including a presser plate, said static eliminator brush being sandwiched between said presser plate and said fixed blade, and fixed to said surface of said fixed blade in said state pressed against said surface of said fixed blade by a plurality of screws screwed through said presser plate into said fixed plate.

19. A tape processing device according to claim 13, including a guide member which is arranged at a location opposed to said static eliminator brush in a manner such that said tape facing said cutter assembly is positioned between said guide member and said static eliminator brush.

20. A tape processing device according to claim 13, wherein said static eliminator brush comprises a plurality of static eliminating elements, each of which is formed by a bundle of static eliminator strands, said static eliminating elements being arranged along a width of said tape facing said cutter assembly in a manner spaced at equal intervals.

* * * * *

UNITED STATES PATENT AND TRADEMARK OFFICE

CERTIFICATE OF CORRECTION

PATENT NO. : 6,145,561
DATED : November 14, 2000
INVENTOR(S) : Kenji Watanabe, et al.

It is certified that error appears in the above-identified patent and that said Letters Patent is hereby corrected as shown below:

Col. 1, line 75, add inventors' names:
Akira HASHIMOTO; Yoshikiyo FURUYA; Hideyuki TSUKUDA, all of Tokyo, Japan.

Signed and Sealed this

Eighth Day of May, 2001

*Attest:*

*Nicholas P. Godici*

NICHOLAS P. GODICI

*Attesting Officer* *Acting Director of the United States Patent and Trademark Office*